United States Patent [19]

Cooke, deceased et al.

[11] 3,962,752

[45] June 15, 1976

[54] METHOD AND APPARATUS FOR REMOVING MEAT FROM CRABS

[75] Inventors: Melvin B. Cooke, deceased, late of Bowie, Md., by Barbara M. Cooke, administrator; Eric Kaiser Pritchard, Bowie, Md.

[73] Assignee: Innovative Seafood Systems, Inc., Bowie, Md.

[22] Filed: Jan. 3, 1975

[21] Appl. No.: 538,329

Related U.S. Application Data

[63] Continuation-in-part of Ser. No. 868,414, Oct. 22, 1969, abandoned.

[52] U.S. Cl. .................................................. 17/71
[51] Int. Cl.² ........................................ A22C 29/00
[58] Field of Search ............................ 17/48, 71, 45

[56] References Cited

UNITED STATES PATENTS

| | | | |
|---|---|---|---|
| 2,545,517 | 3/1951 | Harris et al. | 17/71 |
| 3,696,465 | 10/1972 | Rossman | 17/48 |

Primary Examiner—Robert Peshock
Attorney, Agent, or Firm—Cushman, Darby & Cushman

[57] ABSTRACT

In general, the apparatus includes a plurality of crab holders attached like spokes on a wheel. At the first station the crab is loaded into one crab holder and during transit, the first crab passes two saws where the legs, claws and paddles are removed. The crab continues to move until it passes the second set of saws and the crab is sawed into three separate sections. When the crab is at the fourth station, these clamps automatically rearrange the crab into such a position that the cut faces are available to be picked. At this point the wheel ceases to turn and the pressure chamber including the escape heads advance over the exposed crab and a high pressure fluid such as water forces the meat from the crab into the escape tube. After the crab has been picked, the pressure chamber withdraws and the wheel again begins to move. The clamps are automatically opened and the empty shell ejected. The meat in the meantime, passes via a tube into the separation tank where the meat settles to the bottom and is removed by a revolving door.

6 Claims, 6 Drawing Figures

3,962,752

METHOD AND APPARATUS FOR REMOVING MEAT FROM CRABS

REFERENCE TO RELATED APPLICATION

This is a continuation-in-part of our earlier, copending application, Ser. No. 868,414, filed Oct. 22, 1969, now abandoned.

BACKGROUND OF THE INVENTION

There have been others who have previously proposed mechanical apparatus for removing meat from crabs. Patented examples include those shown in the following United States patents:

| Ward | 2,828,786 | June 17, 1958 |
|---|---|---|
| Tolley | 3,245,105 | April 12, 1966 |
| Rossnan | 3,249,962 | May 10, 1966 |
| Rossnan | 3,257,683 | June 28, 1966 |
| Rossnan | 3,274,640 | September 27, 1966 |
| Rossnan | Re. 26,136 (of 3,249,962) | January 10, 1967 |
| Reinke | 3,495,294 | February 17, 1970 |

In Rossnan, the crab has the legs, etc., severed therefrom in the same operation in which the ends are cut from the crab body. Then the meat is extracted from the cavities of the central segment of the crab body. Because of the combined operation the cuts through the body must be located near the tips of the ends of the body. Thus the remaining central segment is fairly humped across the back and the openings into the cavities are smaller than the pieces of meat contained therein. This makes meat removal more difficult than in the instance of the applicants invention wherein the legs, etc., are severed in a preliminary operation.

SUMMARY OF THE INVENTION

In general, the apparatus includes a plurality of crab holders attached like spokes on a wheel. At the first station the crab is loaded into one crab holder and during transit, the first crab passes two saws where the legs, claws and paddles are removed. The crab continues to move until it passes the second set of saws and the crab is sawed into three separate sections. When the crab is at the fourth station, these clamps automatically rearrange the crab into such a position that the cut faces are available to be picked. At this point the wheel ceases to turn and the pressure chamber including the escape heads advance over the exposed crab and a high pressure fluid such as water forces the meat from the crab into the escape tube. After the crab has been picked, the pressure chamber withdraws and the wheel again begins to move. The clamps are automatically opened and the empty shell ejected. The meat in the meantime, passes via a tube into the separation tank where the meat settles to the bottom and is removed by a revolving door. In the instance of the applicants invention the legs, etc., are severed in a preliminary operation. Then the two cuts which proceed through the body may be closer together leaving some meat in the end segments and the rest in the center section. The end segments and center segments are then simultaneously cleaned with ease due to the larger cavity openings.

It has been determined that in certain instances, there is insufficient meat available in the end segments of the crab bodies to justify processing them. In such instances, the central segments can be processed consistent with the disclosure hereof and the end segments discarded or collected for processing as pet food or the like.

The principles of the invention will be further hereinafter discussed with reference to the drawings wherein a preferred embodiment is intended to exemplify, rather than limit, aspects of the invention as defined in the claims.

DETAILED DESCRIPTION OF THE PRESENTLY PREFERRED EMBODIMENT

Figure 1:
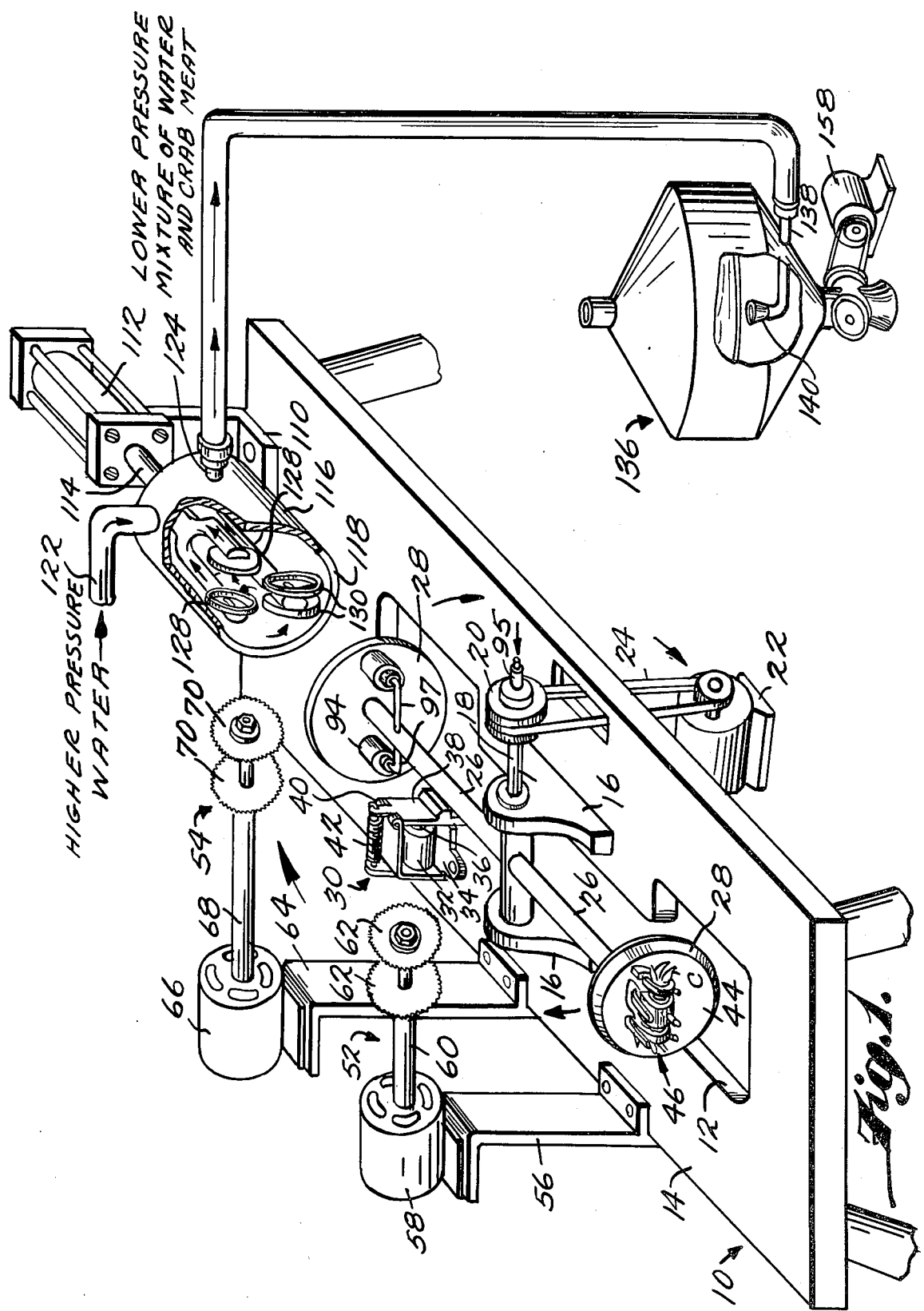
FIG. 1 is a perspective view of the complete apparatus.

With attention first to FIG. 1, there is shown a support frame 10, which, in the instance depicted, resembles a saw horse. A long slot 12 is cut out of the center of the table 14 of the support frame, and two bearings 16 are mounted on the table 14 beside the slot 12. These bearings mount a shaft 18, extending crosswise of the table, for rotation about its own horizontal, longitudinal axis. A pulley forming part of a slip clutch 20 is mounted on one end of that shaft and driven by a motor 22 via an endless belt 24.

The horizontal disposition of the shaft 18 is one of design choice; it could be vertically disposed, with consequent reorientation of the other apparatus elements.

Two arms 26 radiate from the aforementioned shaft like spokes and have disk-shaped clamp-mounting plates 28 on their outer ends.

A solenoid unit 30 is shown mounted on the table 14 intermediate the shaft 18 and the far end of the slot 12. This unit is seen to include a coil 32 mounted on a frame 34 that is secured to the table 14 and a plunger 36 positioned to attract a pivotally mounted latch 38. The latch 38, on on the opposite side of its pivotal mounting 40 from its adjacency with the plunger 36, is connected to the frame 34 by a coil spring 42. This unit 30 is thereby adapted to operate between two modes, depending upon whether or not the solenoid is energized. In one mode, the bottom of the latch 38 is pivoted forward to obstruct the path of the arms 26, and in the other mode the latch 38 is retracted so the arms 26 are free to be rotated through the table slot 12 as the shaft 18 is driven.

In the embodiment being described, the rotation of the shaft which mounts the arms 26 is intermittently stopped when the solenoid unit 30 is operated to catch an arm 26, as depicted, whereupon the clutch 20 slips until the solenoid unit latch 38 is retracted.

When the apparatus is operated, the operator would typically stand with his feet about where the legend "FIG. 1" is, facing the table. In such location, the forward face 44 of one clamp-mounting plate 28 faces the operator, ready for a crab C to be mounted in the clamp 46 thereof.

Figure 2:
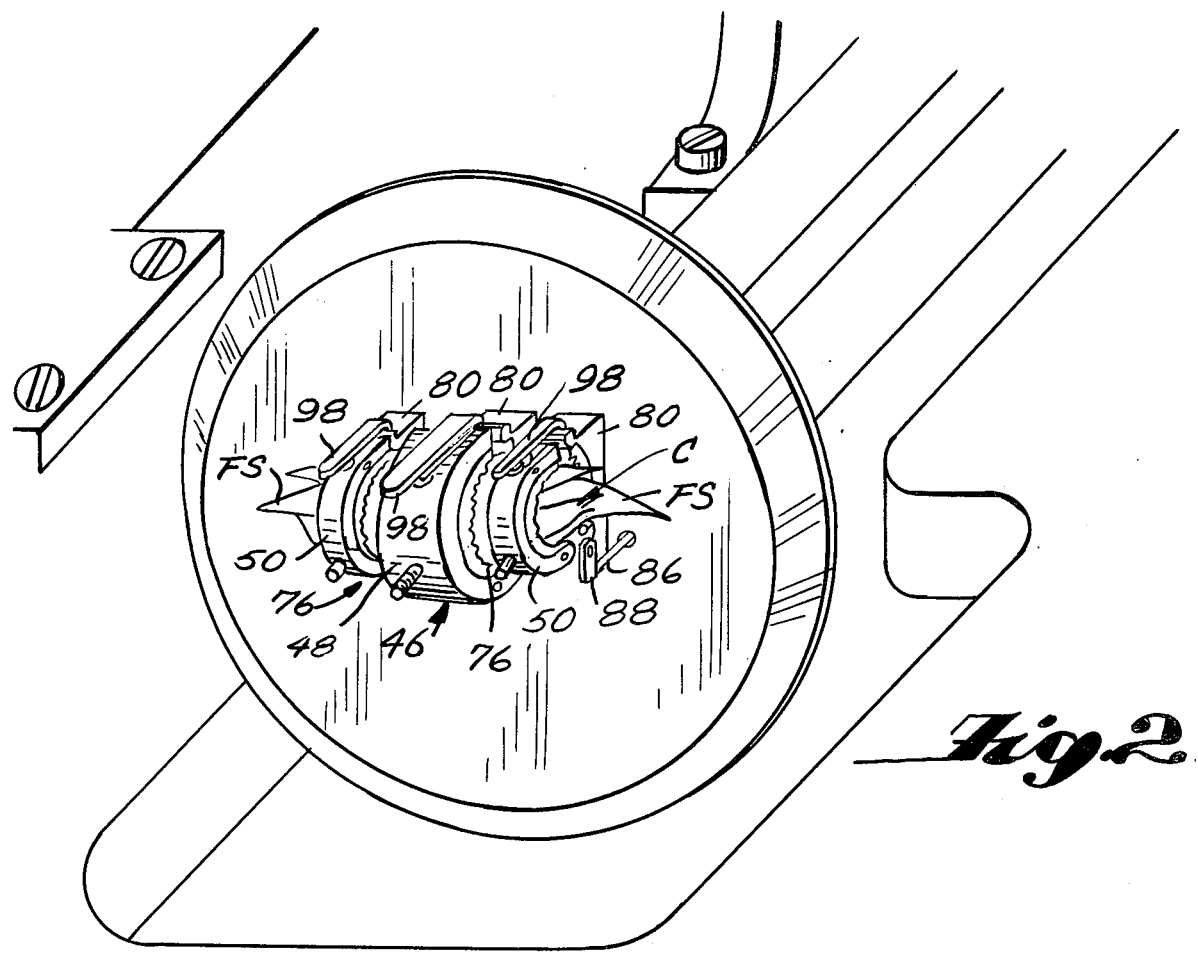
FIG. 2 is a perspective view on a larger scale of the foremost one of the crab holders of FIG. 1.
Figure 3:
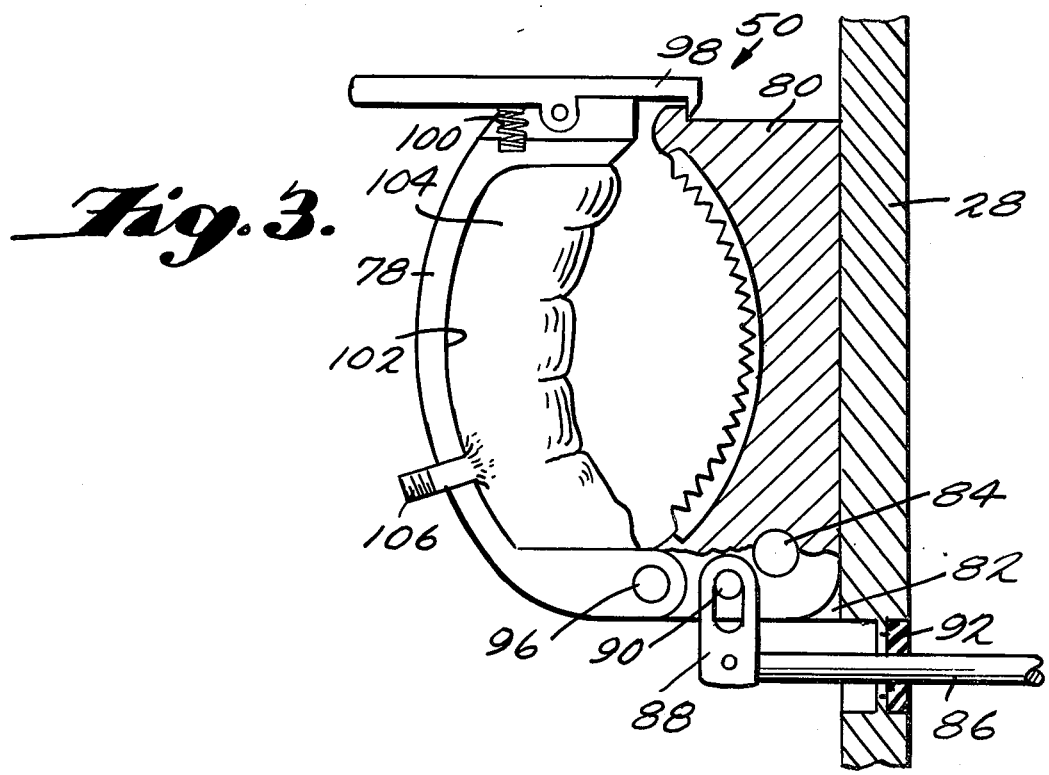
FIG. 3 is a vertical sectional view of one of the three clamps of the crab holder of FIG. 2, taken on line 3—3 of FIG. 2.

More details of one preferred clamp are shown in FIGS. 2 and 3.

The clamp 46 includes a larger central portion 48 and two smaller flanking portions 50 which are at least slightly laterally spaced from the central portion. Accordingly, when a crab is properly installed on the clamp 46, its stomach (bottom side) faces the operator.

It should now be noticed that two sawing stations are mounted on the table 14 beside the slot 12 and mount saws which intersect the rotational path of the crabs mounted on the respective clamps 46. The nearest sawing station 52, in FIG. 1, includes a bracket 56 which mounts a motor 58 having a horizontal, traversely directed shaft 60 on which two saw blades 62 are mounted with axial spacing between them. The other sawing station, 54, includes a bracket 64 which mounts a motor 66 having a horizontal, transversely directed shaft 68 on which two saw blades 70 are mounted with axial spacing between them.

Figure 4:
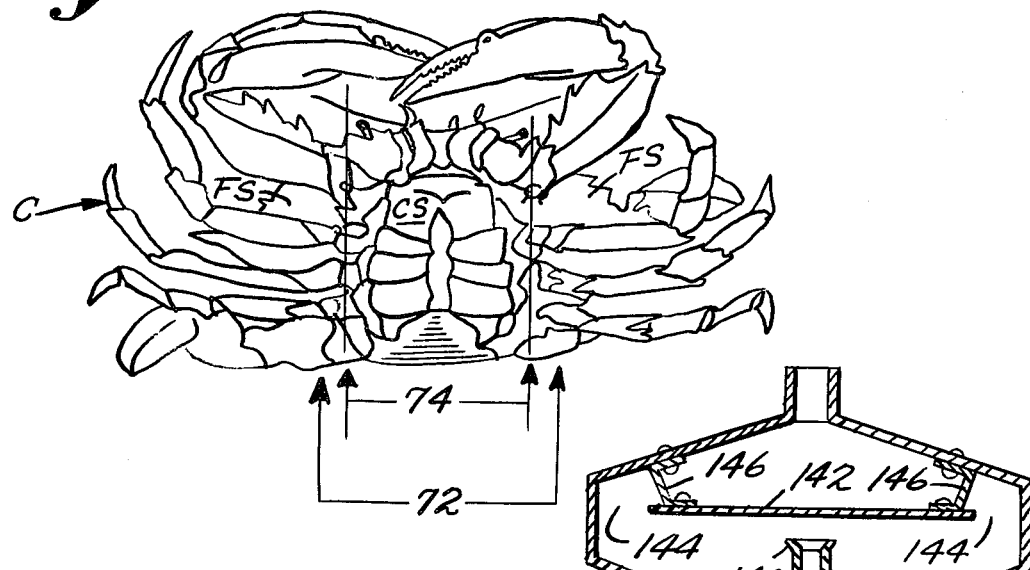
FIG. 4 is a bottom plan view of a crab, showing where the crab is cut by the saws shown in FIG. 1.

The placement of the two saw blades 62 relative to the upward, arcing path of the foremost clamp-mounted crab, when the solenoid 30 latch 38 is released, results in these saws respectively severing the left and right claws, crawling legs and paddles from the crab along the lines 72 in FIG. 4. The saw cuts are not deep enough to pass through the crab body.

The placement of the two saw blades relative to the continued arcing path of the crab from which the claws, crawling legs and paddles have been cut at 52, results in the crab body being severed, by two respective laterally spaced cuts 74, into three sections: a central section CS which remains held by the central portion 48 of the clamp 46, the two flanking end sections FS held by the two respective flanking portions 50 of the clamp. The saw cuts are made in the gaps 76 between the portion 48 and the portions 50.

It is appropriate to consider here the structure of the clamp 46 in more detail, with attention to the front of the foremost clamp shown in FIG. 1, and the rear of the clamp mounting plate 28 on the rearwardly extending arm in FIG. 1, the larger scale view in FIG. 2 and the cross-sectional view of one clamp flanking portion 50 shown in FIG. 3.

Figure 5:
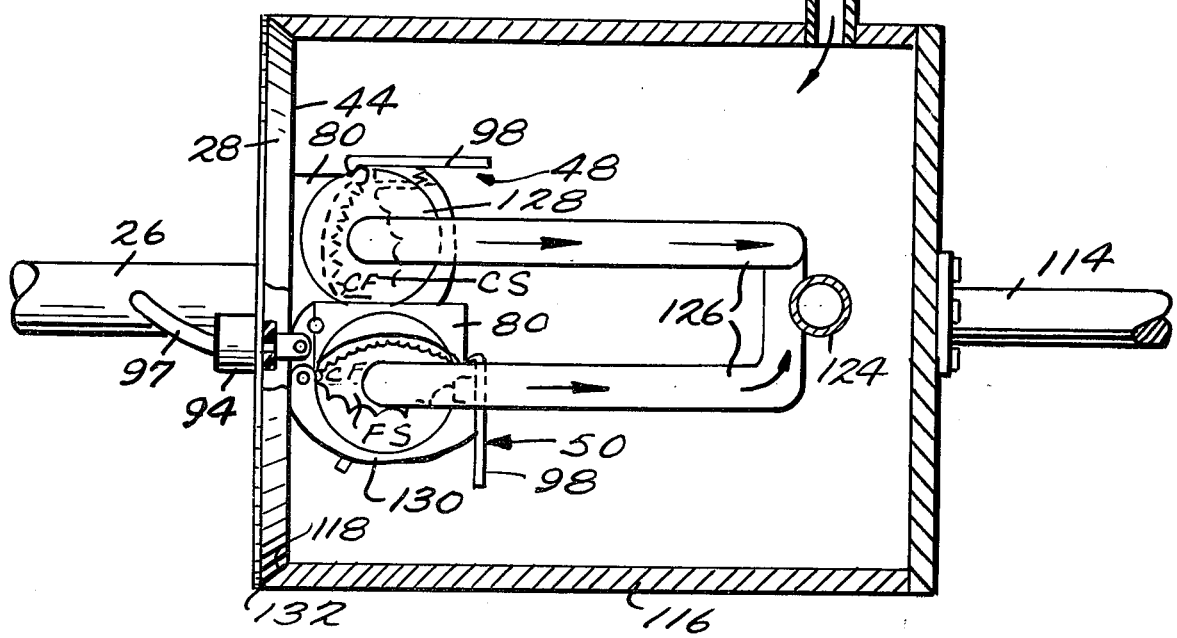
FIG. 5 is a vertical section view of one picking head, advanced against the rearmost one of the crab holders of FIG. 2, after rearrangement of the clamps to expose crab meat for picking, the view being taken on line 5—5 of FIG. 1.

The clamp flanking portions 50 each include a front frame 78 and a back frame 80. The back frame 80 is mounted on the clamp plate 28 by a hinge bracket 82 and a hinge pin 84. In the orientation shown at the front of FIG. 1 and in FIGS. 2 and 3, the clamp flanking portions 50 are vertically oriented, so the two severed crab body end sections FS lie with their cut faces adjacent the respective cut faces of the cut crab body central section CS. In order to expose all four of these cut faces, the two clamp flanking portions 50 (but not the central section 48) are designed to be rotated downwardly about the respective hinge pins 84, relative to the clamp central portion 48 and the clamp mounting plate 28, until the two cut crab body end sections FS held thereby are disposed generally horizontally as shown in FIG. 5. In contrast, the back frame 80 of the clamp central section is fixed to the plate 28.

The movement of the flanking portions 50 is effected by rearward movement of the reciprocal rams 86 which are pivotally, slidably secured by yokes 88 to pins 90, located on the two clamp flanking portions below and forwardly of the hinge pins 84. (Rearward withdrawal of the rams 86 creates couples about the respective pins 84 to move the clamp flanking portions 50 downwardly to the horizontal dispositions shown in FIG. 5 from the vertical dispositions shown in FIGS. 1–3.)

Each ram 86 extends rearwardly through a sealing O-ring 92 in the clamp mounting plate 28. The rams 86 are reciprocated via control cylinders 94 mounted on the back of the clamp mounting plate 28. As a matter of preference, the cylinders 94 are operated by air supplied under pressure through an air inlet 95 shown protruding centrally of the arrow next to the clutch 20. The air proceeds down this tubular shaft 18, out the similarly tubular arms 26, out the two small tubular conduits 97 seen branching to the cylinders 94 from the arm 26 near the back of the rearmost plate 28 in FIG. 1.

The structure of each center and flanking clamp portion 48, 50 will now be described in further detail. Its front frame 78 is pivotally secured to its back frame 80 at the bottom by a hinge pin 96. Thus, to open the three clamp portions 48, 50 so a crab may be loaded therein, the front frames 78 may be pivoted forwardly and down about the hinge pins 96 with respect to the back frames 80. A catch 98, urged toward an operative position by a spring 100, is mounted on each front frame 78 opposite the hinge pin 96. As shown best in FIG. 3, the catch 98 releasably engages with the rear frame 80 to hold the respective clamp section 48, 50 in a closed condition.

The front frame 78 is inwardly concave to define a pocket 102 which holds a bladder 104 which may be inflated through the valve 106. The bladder accomodates size and shape of the respective pocket 102 to the shape of the crab C being held thereby and forces the crab against serrated teeth 108 on the front of the forwardly concave back frame 80 of the respective clamp portion 48, 50.

It is believed apparent from FIG. 3 that the clamp flanking portions may be opened and closed about the hinge pins 96 without need for reciproaction of the rams 86, and the rotation of the clamp flanking portions 50 about the pins 84 due to reciproaction of the rams 86 does not effect opening or closing of the clamp. That is, opening and closing of the three clamp sections 48, 50, and pivoting of the closed clamp flanking portions 50 from vertical to horizontal dispositions are separate operations, as depicted.

The description of the apparatus will now be continued, referring to FIG. 5, wherein a cut crab body is shown mounted on the front face 44 of the rearmost clamp mounting plate 28 of FIG. 1, and wherein the control cylinders 94 have been activated to pivotally displace the two flanking end sections FS of the cut crab body to a horizontal disposition, causing their respective two cut faces CF to be exposed, as well as exposing the two cut faces CF of the central section CS of the crab body. This crab body and the dispositions of the three sections CS and FS and four cut faces CF thereof cannot be seen in FIG. 1, because all face away from the viewer, behind the plate 28 at the rear of the FIG.

It should be noticed that the apparatus further includes a bracket 110 mounted at the rear of the table 14. This bracket mounts a hydraulic cylinder 112 so that its piston rod 114 projects longitudinally, horizontaly, forwardly. A pressure chamber 116 having an open forward end 118 has its rear, closed end secured at 120 on the piston rod 114 of the hydraulic cylinder 112. In FIG. 1, the piston rod 114 is shown in a retracted condition; in FIG. 5, the piston rod 114 is shown in an extended condition.

The pressure chamber has an inlet conduit 122 for water under pressure. The pressure chamber 116 also includes an outlet conduit 124 for recovering a mixture of water and crab meat from within the pressure chamber 116. Within the chamber, the outlet condiut 124 divides at 126 to withdraw water and crab meat from an upper pair 128 and a lower pair 130 are seen to be spaced closer together and directed away from one another.

The central section CS of the unseen, cut crab body is, in FIG. 1, disposed longitudinally forwardly of the space between the upper pair 128 of escape heads, and the two end sections FS of the cut crab body are horizontally disposed longitudinally forwardly of the two respective spaces laterally outwardly beside the lower pair 130 of escape heads.

Accordingly, when the hydraulic cyliner 112 is activated, the pressure chamber 116 is pushed longitudinally forwardly from the position shown in FIG. 1 to the position shown in FIG. 5 until its open forward end 118 seals at 132 against the correspondingly bended outer periphery 134 of the rearwardly directed crab clamp mounting plate 28. Each of the four escape heads 128, 130 is now disposed adjacent a respective exposed face CF of the cut crab body as shown in FIG. 5.

After the chamber 116 seals with the plate 28, water is introduced to the pressure chamber through the inlet 122. The flow rate of this water is sufficiently high, due to the volume of the pressure chamber 116 and the rate of outflow of the mixture of water and crab meat through the conduit 124, that a pressure differential is created between the inside of the pressure chamber and the escape heads 128, 130. The crab meat exposed at the cut faces of the crab body being subject to the effect of this pressure differential, is forced out of the crab shell and into the four escape heads 128, 130. If flows from these heads into the outlet conduit 124, leaving the shell and undesirable parts of the crab still clamped to the plate 28.

Figure 6:
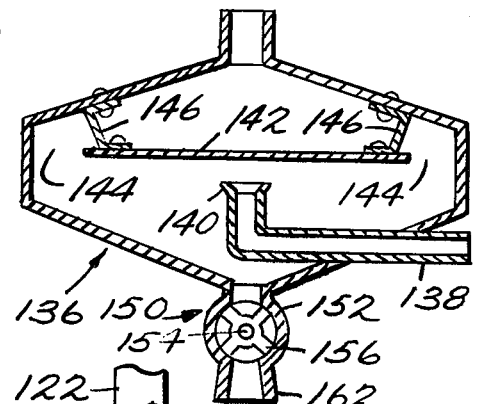
FIG. 6 is a vertical sectional view of the settling tank, taken on line 6—6 of FIG. 1.

The outlet conduit 124 carries the water-borne crab meat to a retrieval tank 136 (FIGS. 1 and 6) via an insertion tube 138. This tube is bell-shaped at its upwardly directed, outlet end 140 in order to make the transition between the tube 138 and the tank 136 as turbulence-free as possible.

The retrieval tank (FIG. 6) is constructed in such a manner as to take advantage of the characteristic that crab meat is heavier than fresh water. The flow rate of the mixture of meat and water leaving insertion tube 138 at 140 is relatively high. Deflection plate 142 is placed in the tank in such a manner as to deflect the meat downward, yet it is also smaller in diameter than the interior of the retrieval tank 136. This difference in diameter creates an annular area 144 surrounding the deflection plate 142, that is much greater than the area of the insertion tube 138, therefore the velocity of the flow in said annular area 144 is much less. The flow velocity around plate 142 is designed to be less than the natural falling velocity of the crab meat, so the meat settles to the bottom of the tank. The deflection plate 142 is held in place by mounting brackets 146 and the water leaves the retrieval tank by exit port 148.

The crab meat which has settled to the bottom of the retrieval tank 136 is removed by a revolving door valve 150. This valve consists of an outer housing 152 connecting the valve 150 to the retrieval tank 136, a rotatable drive shaft 154 which mounts an impeller 156. As drive motor 158 imparts rotary motion to the drive shaft 154, the impeller 156 is turned. The crab meat which has settled to the bottom in the retrieval tank falls into the pockets 160 in the impeller and is carried around by the impeller to the open end 162 of the outer housing 152 where the meat is collected in a tray or the like.

It is evident from FIG. 1 that, while meat is being extracted from one crab within the pressure chamber at the rear, an operator at the station in front of the foremost crab clamping plate may remove the remains of a previously cleaned-out crab from the clamp at that station and load another crab. However, the clamp could be constructed to be automatically opened after the pressure chamber has withdrawn, the solenoid 30 latch has retracted, and the arms 7 begun to rotate, to eject the empty crab shell. It should also be apparent that, as the simplest measure, operation of the solenoid 30, control cylinders 94, hydraulic cylinder 112 and the like may be manually initiated.

As an alternative, the first sawing station 52 and the two clamp flanking sections 50 of each clamp 46 could be eliminated, together with the means 82–95 for moving the sections 50. In such an instance, the clamps 46 would be constituted by the central portions 48, and the flanking end sections, legs, paddles and claws, once cut away by the saws of the remaining sawing station 54, would drop free of the clamp to be collected for processing as pet food or the like.

Although the shaft 18 is shown provided with two arms 26, each with a clamp mounting plate 28 and clamp 46, more, e.g., for such arms could be equally spaced about the shaft 18 to increase the capacity of the machine.

It should now be apparent that the methods and apparatus for removing meat from crabs as described hereinabove possesses each of the attributes set forth in the specification under the heading "Summary of the Invention" hereinbefore. Because the methods and apparatus for removing meat from crabs in the invention can be modified to some extent without departing from the principles of the invention as they have been outlined and explained in this specification, the present invention should be understood as encompassing all modifications as are within the spirit and scope of the following claims.

It is claimed:

1. Apparatus for removing the meat from a crab body, comprising:
   a base;
   pivot means on said base;
   an arm pivoted by said pivot means for rotation on said base and having an end spaced from said pivot means;
   a clamp support mounted on said arm end;
   clamp means on said clamp support for accepting and holding a crab so that the crab moves along a path as the arm pivots about the pivot means;
   first cutting means disposed with respect to said base to intersect said path and to sever the claws, crawling legs and paddles from the crab as the crab moves along said path;
   second cutting means disposed with respect to said base to intersect said path and to sever the body of the crab into a center segment and at one end of each end segment;

means on said clamp support for shifting said clamp to displace the segments to expose the cut surfaces at both ends of the center segment and at one end of each end segment;

means for subjecting the clamped, displaced crab body segments to a differential pressure to drive the meat from the segments to thereby leave behind the undesirable parts of the crab body.

2. The apparatus of claim 1 wherein the subjecting means includes:

a pressure tight housing adapted to receive the clamped segmented crab body borne along said path by said clamp means;

first conduit means for admitting water to the housing, second conduit means for withdrawing water and crab meat from the housing, said latter conduit means having inlets disposed adjacent where the cut surfaces of the displaced segments become located when the clamped segmented crab body is disposed within the pressure tight housing.

3. The apparatus of claim 2 wherein the clamp means includes a front frame and a rear frame adapted to pass around the back and stomach of the crab, respectively; and adjustable means mounted between the front and rear frames for varying the size of the clamp means to accomodate crabs of varying size.

4. The apparatus of claim 2 further including:

a settling tank for receiving the withdrawn water and crab meat;

said second conduit means opening into said settling tank intermediate the height of the settling tank;

third conduit means at the bottom of said settling tank for withdrawal of settled crab meat;

this conduit means having rotary impeller means disposed therein for assisting removal of settled crab meat; and fourth conduit means for withdrawing water from above the settled crab meat in said settling tank.

5. The apparatus of claim 4 wherein said settling tank and the conduit means communicating therewith are shaped to limit the velocity of water rising in said tank to below the natural settling velocity of crab meat in water.

6. Apparatus for removing the meat from a crab body, comprising:

a base;

pivot means on said base;

an arm pivoted by said pivot means for rotation on said base and having an end speced from said pivot means;

a clamp support mounted on said arm end;

clamp means on said clamp support for accepting and holding a crab so that the crab moves along a path as the arm pivots about the pivot means;

cutting means disposed with respect to said base to intersect said path and to sever the claws, crawling legs and paddles from the crab and to sever the body of the crab into a center segment and two end segments as the crab moves along said path;

means for subjecting the crab body central segment to a differential pressure in a sense to drive the meat from the central segment to thereby leave behind the undesirable parts of the crab body, the subjecting means including:

a pressure tight housing adapted to receive the clamped central segment of the crab body borne along said path by said clamp means;

first conduit means for admitting water to the housing, second conduit means for withdrawing water and crab meat from the housing, said latter conduit means having inlets disposed adjacent where the cut surfaces of the central segment becomes located when the clamped central segment of the crab body is disposed within the pressure tight housing;

the clamp means including a front frame and a rear frame adapted to pass around the back and stomach of the crab, respectively; and adjustable means on one of the front and rear frames for varying the size of the clamp means to accomodate crabs of varying size.

* * * * *